May 16, 1933. W. G. WILSON 1,909,478
VALVE AND SIMILAR STRUCTURE AND METHOD OF PRODUCING IT
Filed Dec. 18, 1928 2 Sheets-Sheet 1
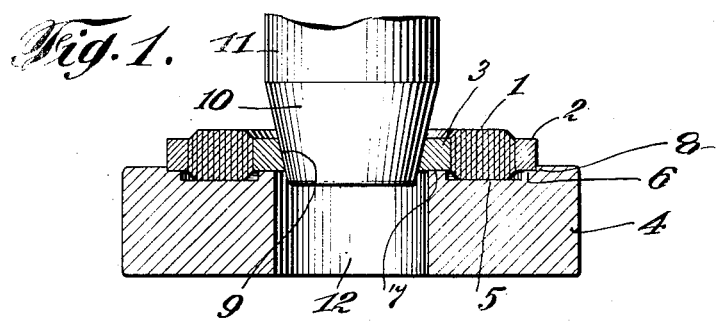
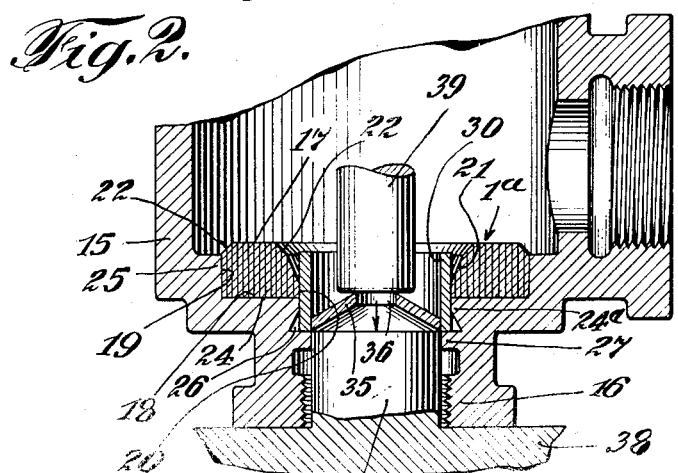
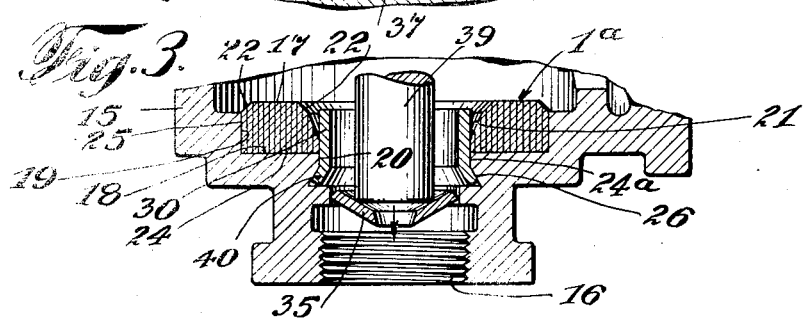
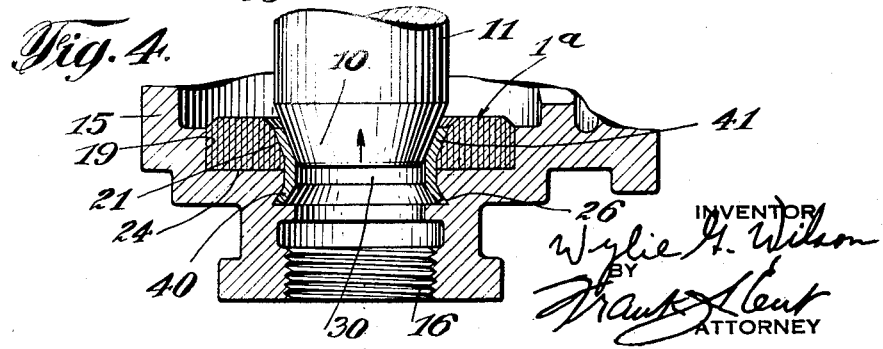

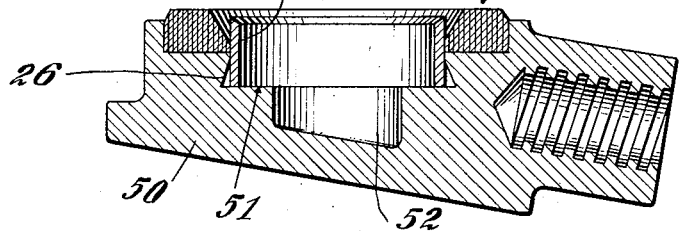
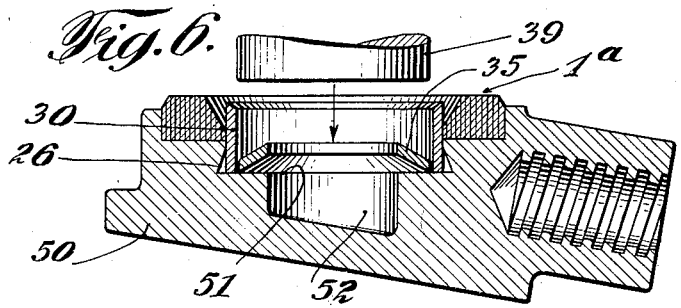
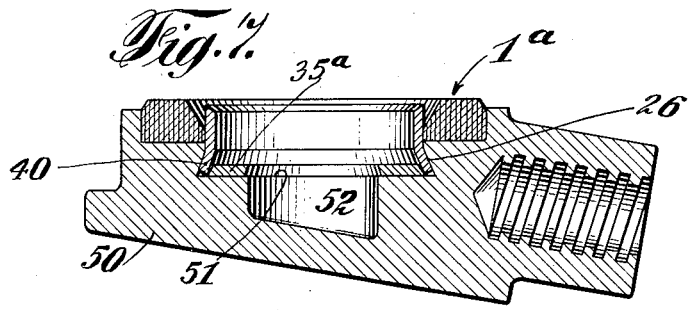
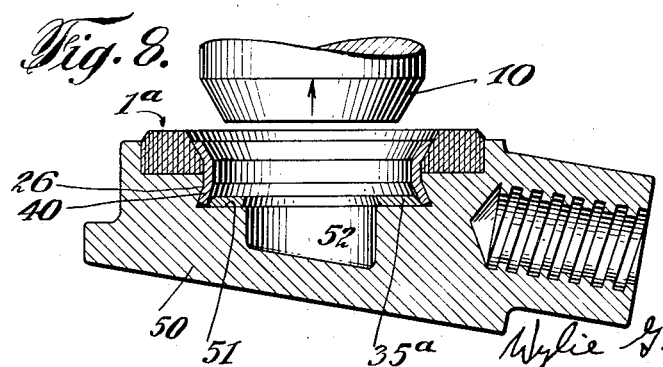

Patented May 16, 1933

1,909,478

UNITED STATES PATENT OFFICE

WYLIE G. WILSON, OF ELIZABETH, NEW JERSEY, ASSIGNOR TO EVERLASTING VALVE COMPANY, OF JERSEY CITY, NEW JERSEY, A CORPORATION OF NEW JERSEY

VALVE AND SIMILAR STRUCTURE AND METHOD OF PRODUCING IT

Application filed December 18, 1928. Serial No. 326,797.

My invention relates to mechanical structures consisting, as principal parts, of annular or ring-like elements connected under pressure by coercive deformation—contraction or expansion of one of them; or in practical applications, as here shown, of an annular facing or packing ring secured in a supporting formation in a valve element (either as the "seat" or movable element of the valve), by a ring or thimble which retains the packing ring permanently under desired high compression, without screws or other displaceable elements; and the invention also includes methods of producing such structures.

The invention contemplates a construction in which a compressible annular member is located between inner and outer annular members, the outer annular member being contracted to retain the compressible member in compressed condition.

The characteristics and advantages of the invention are best further explained in connection with the following detail description of the accompanying drawings, which shows certain exemplifying embodiments. After considering these examples, skilled persons will understand that many variations may be made, and I contemplate the employment of any structures that are properly within the scope of the appended claims.

In the drawings:

Fig. 1 is a view, in axial section, of a structure embodying the invention in one form, and also explaining one production method.

Fig. 2 is a similar section of a partially completed valve structure, also explaining early stages of the process of production.

Figs. 3 and 4 show successive subsequent stages of the process, and Fig. 4 shows the completed structure.

Fig. 5 shows another valve structure in a preliminary stage or condition.

Figs. 6 and 7 explain successive subsequent stages of the process.

Fig. 8 shows the completed valve structure.

In Fig. 1, 1 is a ring, which may be considered, as an example, to be a valve facing or packing ring similar to the part 5, in my prior Patents No. 1,613,072, 1,627,299 and 1,645,785, although of slightly different cross sectional form. This ring is composed of laminæ of asbestos, compressed and vulcanized, but still substantially compressible and resilient, as for the purposes set forth in the patents. Otherwise, the ring 1 may be of other, more or less compressible material, which it is desired to secure under compressive tension, between outer and inner retaining or holding rings 2 and 3, respectively. The rings 2 and 3 are of metal, preferably steel, although other metals may be used, in some cases. Ring 2 preferably has a fit about the periphery of ring 1, and ring 3 will usually have a fairly close fit in the inner wall of ring 1, although some relative looseness of these rings is not objectionable in some cases. The rings are assembled as shown, and placed upon a supporting, or abutment block, 4, which has an annular, flat surface 5 to support the under face of ring 1, and outer and inner annular shoulders, or flat surfaces, 6 and 7 respectively, to support the underfaces of rings 2 and 3, respectively. The block may also have a vertical, annular shoulder 8, of greater or less depth, surrounding the periphery of ring 2, to support the same against expansion, in cases where this ring has insufficient sectional area to enable it to resist the applied expansive force, when unsupported. Ring 3 has its inner wall 9 formed as a female cone, to cooperate with the conical end-portion 10 of an expanding plunger 11; and block 4 has an internal aperture 12 to admit the end of the plunger.

The plunger is forced down with suitable pressure to expand ring 3 to the desired extent, thus additionally compressing the packing ring 1, which is thereafter firmly and permanently held. Plunger 11 is withdrawn, leaving rings 1, 2 and 3 as a practically unitary structure, utilizable as a valve element, or for other purposes, as will be understood by skilled persons.

In the construction of Fig. 1 the outer ring 2 may be contracted to put compression on the wear ring 1 and to hold ring 1 permanently in compressed condition. The laminations of wear ring 1 run parallel to the outer cylindrical wall of the wear ring, as clearly shown in the drawings, and this arrangement permits compressing the laminations of the wear ring for a considerable portion of their cross-axial width between the rings 1 and 2, thereby firmly compressing and holding the laminations.

Figs. 2, 3 and 4 show more particularly, one complete application or adaptation of the invention, illustrative of a practically indefinite variety of such adaptations.

The facing, or packing, ring $1^a$ is of sectional form substantially like that shown in the above mentioned patents, and in this example is arranged as a valve seat packing, instead of as a packing or facing for the movable valve element; but may as well be applied to the movable element (as exemplified in Figs. 5 to 9, later described.)

The broader aspects of the invention, ring $1^a$ may be of widely varying character; thus it may be "solid" (non laminar) and compressible or incompressible; and its cross-sectional form may also vary. The form or type shown is especially desirable for certain purposes.

The body, or housing 15 has a port 16, at the inner end of which the packing ring $1^a$ is to be secured to form the valve seat, proper. This ring has upper and lower flat faces 17 and 18, respectively, an outer cylindrical wall or surface 19, a shallow, lower inner cylindrical surface 20, and above that, an outwardly flared or conical surface 21, and the upper portions of the outer and inner walls are preferably formed with bevels 22, whereby the upper surface 17, which is the sealing face, is of reduced annular width, as shown. The sectional form of the ring may be varied considerably, the form chosen being practically identical with that shown in the above identified patents, in order to show how such a sealing ring may be properly and permanently secured, under compression, on a proper support, without the use of screws or similar devices, as shown in said patents, and which in use are liable to become loosened, or even to fall out, and cause annoyances and difficulties readily understood by skilled persons in this art. Especially, in the case of a compressible packing ring, which must be clamped in place under pressure, as shown in said patents, by the use of screws or nuts, it is practically impossible for the workman to uniformly adjust the clamping devices, and therefore in some cases the packing may be clamped too tightly (at the risk of breaking or stripping the screw threads) or in other cases, too loosely. In the present invention, as will appear, the packing is held by positively secured devices, which are applied under conditions permitting the degree of pressure to be closely regulated, and made uniform for any plurality of structures.

Housing 15 has a ring seat, or socket, consisting of a horizontal (cross-axial) bottom wall 24 and a peripheral wall 25. Below the bottom wall is an annular channel 26, in this case of "undercut" or conical form, and located just above a flange or shoulder 27, which projects inwardly in the port passage sufficiently to receive and support the lower end of a cylindrical clamping thimble 30.

This thimble is of any suitable metal, of substantial wall thickness, and is dimensioned to fit with reasonable closeness (or may even have a press fit) within the cylindrical wall portion 24 of ring $1^a$ and adjacent portion $24^a$ of the port passage.

An expanding disc 35 is placed in thimble 30, with its periphery opposite the lower end of the latter and also opposite channel 26 in the valve body. This expanding disc is to be deformed and expanded (to produce a desired expansion of the lower end of the thimble) by a process which I call "conical distortion"; that is, its cone angle, or "degree" of conicity, is to be changed, to produce the desired peripheral expansion. For this purpose the disc may be originally flat, and then after location as stated, distorted to conical form; or as shown, and preferably in many cases, it is originally conical, and is expanded by partial, or usually, complete flattening.

The expanding disc, when of conical type, as shown, may have the characteristics set forth in my companion application above identified, and which also discloses the present method, so far as concerns the expansion and locking of a tubular element in a channeled body, by the use of such an expanding disc. Further description of the disc herein is therefore unnecessary, except to say that it preferably has a central aperture 26, and is therefore in the form of a truncated cone.

An abutment 37 is inserted through port 16, to support the disc in position, with the cone-base resting on the end of the abutment; conveniently in some cases, and as shown, this abutment may be a part of a supporting base 38 for the valve casing.

A plunger 39 is now applied to the disc top, with force sufficient to flatten the disc, whereby it is peripherally expanded, and expands the lower end of thimble 30, as at 40, into channel 26 (Fig. 3), thus locking the thimble in place. The plunger movement is continued, as also indicated in Fig. 3, first distorting the disc again to conical form (but in a "direction" opposite to its first condition; that is, the conical shape of the disc is reversed) and finally the disc is ejected through port 16 (the abutment plunger 37 having been removed).

An expanding plunger 11, (Fig. 4) similar to that of Fig. 1 is now applied to the upper end of thimble 30, and the conical plunger end 10 expands the upper part of the thimble to conical form, as at 41, conforming to the conical wall 21 of the packing ring, which is at the same time compressed to the desired, or predetermined extent by proper regulation of the plunger pressure. The plunger is then withdrawn. The deformation of the thimble is permanent, and the packing ring is therefore positively and permanently held in place in its seat and is also retained in proper compression, without the use of any holding devices such as screws, which are subject to loosening, or objectionable for other reasons as sufficiently referred to above.

Figs. 5 to 8 show a modification, or variation, in which a similar packing ring 1ª is secured to a movable valve member 50, which is in this case of modified gate valve type, and substantially like that shown in my Patent No. 1,645,785, although the packing may be applied in a similar way, to other types of movable valve elements, including reciprocating valves such as are shown in my Patents Nos. 1,613,072 and 1,627,299.

The body 50 has a seat or socket to receive the packing ring, and an undercut channel for engagement by thimble 30, which are similar to those of the previous example, and identified by the same numerals; at the bottom of channel 26 is a flat, transverse (cross-axial) surface 51, and when a countersink, or recess, such as 52 is provided, the surface 51 may be in the form of an annular shoulder, on which the lower end of thimble 30 rests, and this shoulder extends far enough inward to support the expanding disc 35, thus dispensing with any supporting abutment, apart from the valve structure itself.

The parts being positioned as in Fig. 5, the deforming plunger 39 is applied to the disc (Fig. 6) and the disc is flattened (35ª Fig. 7), thus expanding and locking the thimble at 40 into channel 26, substantially as in the previous example; since in this case there is no fluid passage through the valve member, it is unnecessary to remove the disc, which remains in place and positively locks the thimble.

The plunger 10 is then applied to (Fig. 8) expand the upper end of the thimble, as in the previous example, and withdrawn, leaving the completed structure as also shown in Fig. 8.

My companion application, above referred to, shows how, in analogous structures a tubular part such as the thimble 30, may be secured by distortion to conical form of an originally flat disc; such means or methods are here included in the scope of the broader claims, and it is considered unnecessary to definitely show this specific variation.

I claim:
1. A composite structure comprising an outer annular member, an inner annular member, and a compressible annular member between the inner and outer annular members, the compressible annular member having an outer cylindrical wall and being formed with laminations parallel to said cylindrical wall, the outer annular member being contracted to retain the compressible ring in compressed condition, all of the annular members being continuous rings.

2. A composite structure comprising an outer annular member, an inner annular member, and a compressible annular member between the inner and outer annular members, the compressible annular member having an outer cylindrical wall and being formed with laminations parallel to said cylindrical wall, the outer annular member being contracted to retain the compressible ring in compressed condition, the inner and outer members being of metal and the compressible member being of non-metallic material, all of the annular members being continuous rings.

In testimony whereof I affix my signature.
WYLIE G. WILSON.